UNITED STATES PATENT OFFICE.

GEORGE B. BURNHAM, OF BERKELEY, CALIFORNIA.

PROCESS OF OBTAINING POTASSIUM SALTS FROM LIQUIDS CONTAINING THE SAME.

1,328,416.  Specification of Letters Patent.  Patented Jan. 20, 1920.

No Drawing.  Application filed September 18, 1916. Serial No. 120,602.

*To all whom it may concern:*

Be it known that I, GEORGE B. BURNHAM, a citizen of the United States, and a resident of Berkeley, county of Alameda, and State of California, have invented a certain new and useful Process of Obtaining Potassium Salts from Liquids Containing the Same, of which the following is a specification.

The invention relates to a process of obtaining potassium salts from bittern and other saline waters.

An object of the invention is to provide a process of separating potassium chlorid from solutions containing sodium, potassium, sulfate and chlorid ions.

A further object of the invention is to provide a process of separating potassium chlorid from solutions containing sodium, potassium, magnesium, sulfate, and chlorid ions.

A further object of the invention is to provide a process for the above mentioned purpose which can be carried on at small expense.

The invention possesses other advantageous features, some of which, with the foregoing, will be set forth at length in the following description where I shall outline in full the preferred method of carrying out the process of my invention. It is to be understood, however, that variations in the process may be made without departing from the spirit of the invention as expressed in the succeeding claims.

Bittern, the mother liquor left over in the process of extracting ordinary salt, NaCl, from sea water, contains large percentages of sodium, potassium, magnesium, sulfate, and chlorid ions, and is saturated with sodium chlorid. The saline deposits from dried up inland lakes of the western part of the United States are composed principally of sodium, potassium, chlorid, sulfate, carbonate and bicarbonate ions and are usually saturated with sodium chlorid. When the liquor to be treated contains magnesium, either in the form of sulfates or chlorids or both, the first step in the process is to eliminate the magnesium from the solution. This is accomplished by treating the liquor with a solution of sodium carbonate, which reacts to form the insoluble magnesium carbonate and basic magnesium carbonate, which are precipitated and then removed by any suitable method, such as filtering or decantation. The sodium carbonate solution need not be pure, but may be any solution containing sodium carbonate which does not contain any other ingredients which are detrimental to the process. The saline solution obtained from dried up inland lake beds may be used for this purpose and on account of its low cost and of the other desirable ingredients which it contains, its use is advantageous. The carbonates and bicarbonates of such solution are capable of uniting with the magnesium and forming insoluble basic carbonates and bicarbonates, and the other ingredients play no part in this particular reaction.

After the magnesium has been precipitated from the liquor by adding sufficient, but not an excess of, carbonates and bicarbonates, or either of them, and the precipitate removed, the remaining liquor contains sodium and potassium sulfates and chlorids. When the liquor contains no magnesium, it is to be understood that the previously described step in the process is eliminated.

The liquor containing the sodium, potassium, chlorid and sulfate ions, and saturated with sodium chlorid is placed in a suitable container or vat and a portion of the water contained therein is evaporated, increasing the concentration of the salts therein and causing crystallization of some sodium chlorid. The liquor is then cooled to cause a deposit of other of the salts and the remaining liquor is withdrawn from the container or vat while cool and introduced in a second container. In the second container the process of evaporating and cooling is repeated, causing a further deposit of salts and the remaining liquor is withdrawn while cool and introduced into a third container. This process of evaporating and cooling and then conveying the remaining cool liquor to another container is repeated until saturation of the liquor with a salt or salts of potassium is reached. The number of cycles of this operation to obtain saturation of the liquor with the potassium salt depends upon the original concentration of the liquor, the temperatures reached in evaporating and cooling, the time of manipulation and other factors, and I do not limit myself to any specified number of cycles, which may be one or more. The nature of the potassium salt in the saturated liquor depends upon the temperature of the liquor when the point of saturation is reached. To obtain saturation with potassium chlorid, the point of saturation with the potassium salt should be reached at a temperature below 4.4° centigrade and if saturation is reached at a temperature above 4.4° centigrade the salt will be a double salt of potassium which may be potassium sodium sulfate $K_3Na(SO_4)_2$. It is desired in the first stages of the process to obtain the solution saturated with potassium chlorid below 4.4° C. and not above 4.4° C., as in the latter case, it would necessitate a considerable deposit of potassium in the form of potassium sodium sulfate which is not desired. This saturation with potassium chlorid below 4.4° C. can be obtained by evaporating above 4.4° C., whereupon the solution becomes saturated with potassium sodium sulfate, then, as soon as the solution becomes saturated, or nearly saturated, with potassium sodium sulfate it is cooled to below 4.4° C., whereupon it becomes saturated with potassium chlorid. The potassium sodium sulfate does not appear, nor can it exist, in this solution below 4.4° C., nor during the cooling process is there any potassium sodium sulfate deposited, for the solubility of potassium sodium sulfate is not appreciably affected by temperature changes. Sodium salts alone are deposited during evaporation and cooling in the above stages. When the original solution contains carbonates or bicarbonates the saturated solution may also contain complicated double carbonates or other chemical forms.

The saturated solution of potassium chlorid is then treated to crystallize out the potassium chlorid as follows: The liquor is evaporated at a temperature above 4.4° centigrade, and a saturated solution of a double potassium salt is usually again obtained. This saturated solution is then evaporated to deposit a small amount of the double potassium salt and cooled to produce a saturated potassium chlorid solution which is separated from the deposited salt. Then the potassium chlorid is obtained from its saturated solution by cooling the solution to crystallize out the potassium chlorid. It may be necessary to crystallize out a portion of the chlorid and remove the liquor to another container wherein it is treated to further concentrate the solution and then cooled to crystallize out the chlorid. The number of cycles of this operation depends on the ranges of temperature used. The double potassium salts deposited are removed from the container, redissolved in water or in the saline solution or bittern and introduced into the process in the proper container according to the amount of potassium therein. In some cases depending upon the amount of cooling below 4.4° C., which the liquor has previously been subjected to and the particular temperature of evaporation above 4.4° C., which the solution has subsequently received, there will be no formation of the double salt potassium sodium sulfate. The solution will become saturated with potassium chlorid immediately and cooling will crystallize out potassium chlorid. Throughout the entire process the formation of potassium sodium sulfate will be avoided. Where weather conditions are satisfactory or where artificial temperatures are used this procedure would probably be preferred.

It is to be understood that the process is also applicable to removing potassium salt from saline waters or dried up saline deposits and is carried out in the same manner as with bittern with the exception that the step for the removal of the magnesium is omitted when there is no magnesium contained in the raw material.

Artificial or natural evaporation and temperature changes may be used. When natural methods are used and solar heat is utilized for evaporation in the open air, the changing temperatures of day and night do not necessitate the immediate change of liquor from one container to another and the liquor should be allowed to remain in the container until the desired saturation is reached. The solutions, however, should be changed from one container to the other at that time when the desired temperature exists. In that part of the process wherein the liquor is evaporated and then cooled to deposit certain salts, the change should be made while the liquor is cool, to avoid resolution.

I claim:

1. The process of recovering potassium chrolid from solutions containing sodium, potassium, sulfate and chlorid ions, which consists in evaporating the solution to approximate saturation with potassium sodium sulfate, cooling the solution to below 4.4° C. to saturation with potassium chlorid whereby other salts are crystallized out, removing the solution from the deposited salts, evaporating the solution about 4.4° C. to saturation with potassium sodium sulfate, evaporating the solution to deposit some of the potassium sodium sulfate, cooling the solution to approximate saturation with potassium chlorid, removing the solution from the deposited salts, and further cooling the solution to crystallize out potassium chlorid.

2. The process of recovering potassium chlorid from solutions containing potassium, sodium, chlorid and sulfate ions, and approximately saturated with sodium chlorid, which consists in evaporating the solution to approximate saturation with a double salt of potassium, cooling the solution below 4.4° C. to approximate saturation with potassium chlorid whereby sodium salts are crystallized out, separating the solution from the crystallized salts, evaporating the solution above 4.4° C. to crystallize out some potassium sodium sulfate and cooling the solution to crystallize out potassium chlorid.

3. The process of recovering potassium chlorid from solutions containing sodium and potassium sulfate and chlorid, which consists in evaporating and cooling the solution to obtain a deposit of sodium salt, separating the cooled solution from the deposited salt, repeating the evaporating, cooling and separating steps until a saturated solution of potassium salt remains and bringing said solution to saturation with potassium chlorid at a temperature below 4.4° C., and evaporating and cooling the solution to crystallize out potassium chlorid.

4. The process of recovering potassium salts from a solution containing sodium and potassium sulfate and chlorid and saturated with a double salt of potassium which consists in cooling the solution below 4.4° C. to saturation with potassium chlorid whereby sodium salts are crystallized out, separating the saturated solution from the crystallized salts and evaporating and cooling the separated solution to crystallize out potassium chlorid.

5. The process of recovering potassium salts from a solution containing potassium and sodium sulfates, chlorids, carbonates and bicarbonates and saturated with one or more double salts of potassium which consists in cooling the solution to saturation with potassium chlorid whereby other salts are crystallized out, separating the solution from the crystallized salts and evaporating and cooling the separated solution to crystallize potassium chlorid out of solution.

In testimony whereof, I have hereunto set my hand at San Francisco, California, this 11th day of September 1916.

GEORGE B. BURNHAM.

In presence of—
H. G. PROST.

It is hereby certified that in Letters Patent No. 1,328,416, granted January 20, 1920, upon the application of George B. Burnham, of Berkeley, California, for an improvement in "Processes of Obtaining Potassium Salts from Liquids Containing the Same," errors appear in the printed specification requiring correction as follows: Page 2, line 104, claim 1, for the word "chrolid" read *chlorid;* same page and claim, line 112, for the word "about" read *above;* and that the said Letters Patent should be read with these corrections therein that the same may conform to the record of the case in the Patent Office.

Signed and sealed this 9th day of March, A. D., 1920.

[SEAL.]

M. H. COULSTON,
*Acting Commissioner of Patents.*

C. 23—22.